US009360712B2

(12) United States Patent
Yang et al.

(10) Patent No.: US 9,360,712 B2
(45) Date of Patent: Jun. 7, 2016

(54) LCD DEVICE AND MANUFACTURING METHOD THEREOF

(71) Applicant: Innolux Corporation, Miao-Li County (TW)

(72) Inventors: Ching-Che Yang, Miao-Li County (TW); Fu-Cheng Chen, Miao-Li County (TW); Yu-Heng Yang, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 52 days.

(21) Appl. No.: 14/048,147

(22) Filed: Oct. 8, 2013

(65) Prior Publication Data

US 2014/0104548 A1 Apr. 17, 2014

(30) Foreign Application Priority Data

Oct. 12, 2012 (CN) .......................... 2012 1 0387534

(51) Int. Cl.
*G02F 1/1339* (2006.01)
*G02F 1/1335* (2006.01)
*G02F 1/1343* (2006.01)
*G02F 1/1337* (2006.01)

(52) U.S. Cl.
CPC ............ *G02F 1/1339* (2013.01); *G02F 1/1337* (2013.01); *G02F 1/1343* (2013.01); *G02F 1/13394* (2013.01); *G02F 1/13439* (2013.01); *G02F 1/133512* (2013.01); *G02F 2001/13396* (2013.01); *G02F 2201/503* (2013.01)

(58) Field of Classification Search
None
See application file for complete search history.

(56) References Cited

U.S. PATENT DOCUMENTS

2005/0007539 A1* 1/2005 Taguchi et al. ............... 349/155
2007/0132920 A1 6/2007 Suzuki et al.
2011/0222016 A1 9/2011 Kaneko et al.

OTHER PUBLICATIONS

EPO Search Report dated Jan. 2, 2014.

* cited by examiner

*Primary Examiner* — Richard Kim
(74) *Attorney, Agent, or Firm* — McClure, Qualey & Rodack, LLP

(57) ABSTRACT

The invention provides a liquid crystal display (LCD) device comprising a first substrate, a first electrode, a second substrate, a liquid crystal layer, a main spacer and an auxiliary spacer. The first electrode is disposed on the first substrate and has a first thickness and a second thickness, wherein the first thickness is smaller than the second thickness. The second substrate and the first substrate are disposed oppositely. The liquid crystal layer is disposed between the first substrate and the second substrate. The main spacer is disposed between the first substrate and the second substrate and corresponding to a part of the first electrode having the first thickness. The auxiliary spacer is disposed between the first substrate and the second substrate and corresponding to a part of the first electrode having the second thickness.

20 Claims, 6 Drawing Sheets

US 9,360,712 B2

LCD DEVICE AND MANUFACTURING METHOD THEREOF

This application claims the benefit of People's Republic of China application Serial No. 201210387534.5, filed Oct. 12, 2012, the subject matter of which is incorporated herein by reference.

BACKGROUND

1. Field of the Invention

The invention relates in general to a display device, and more particularly to a liquid crystal display (LCD) device with spacers.

2. Description of the Related Art

With the development of electronic products, electronic devices with a display screen have become popular in everyday life. The liquid crystal display (LCD), being a kind of display screen, normally has two substrates, and a liquid crystal molecule layer is interposed between the two substrates. A plurality of spacers are used for controlling the thickness of the LCD, maintaining a uniform cell gap between upper and lower substrates, and preventing the non-uniform thickness and the response characteristics of liquid crystal molecules from changing, which may result in a blurred display frame.

In general, reducing the cell gap between upper and lower substrates of an LCD may save the usage amount and increase the response rate of liquid crystal molecules. However, thickness of spacer determines its capacity for receiving stress between upper and lower substrates of the LCD. As the cell gap between two substrates diminishes and makes the thickness of the spacer reduce to such an extent that the spacer can no longer bear the stress of the substrates, the stress may be concentrated on the spacer and further make the spacer deformed or shifted. The disposition of spacers affects the inclination of liquid crystal molecules. The distribution problems of spacers, such as deformation and shifting, will affect the actuation of liquid crystal molecules, and accordingly change the contrast or even the view angle and quality the LCD.

SUMMARY

The disclosure is directed to a liquid crystal display (LCD) device. The electrodes of LCD device have at least have two thickness, and the thickness of the electrode corresponding to the main spacer is smaller than that corresponding to the auxiliary spacer.

According to an embodiment of the disclosure, a liquid crystal display (LCD) device comprising a first substrate, a first electrode, a second substrate, a liquid crystal layer, a main spacer and an auxiliary spacer is provided. The first electrode is disposed on the first substrate and has a first thickness and a second thickness, wherein the first thickness is smaller than the second thickness. The second substrate and the first substrate are disposed oppositely. The liquid crystal layer is disposed between the first substrate and the second substrate. The main spacer is disposed between the first substrate and the second substrate and corresponding to the part of the first electrode having the first thickness. The auxiliary spacer is disposed between the first substrate and the second substrate and corresponding to the part of the first electrode having the second thickness.

According to another embodiment of the disclosure, a manufacturing method of LCD device is provided. The method comprises the following steps. A first substrate is provided, wherein a first electrode is disposed on the first substrate and has a first thickness and a second thickness, and the first thickness is smaller than the second thickness. A main spacer is disposed on a part of the first substrate corresponding to the first electrode having the first thickness. An auxiliary spacer is formed on a part of the first substrate corresponding to the second thickness. The first substrate is aligned and sealing with a second substrate. A liquid crystal layer is injected between the first substrate and the second substrate.

The above and other aspects of the invention will become better understood with regard to the following detailed description of the preferred but non-limiting embodiment(s). The following description is made with reference to the accompanying drawings.

DETAILED DESCRIPTION

Figure 1:
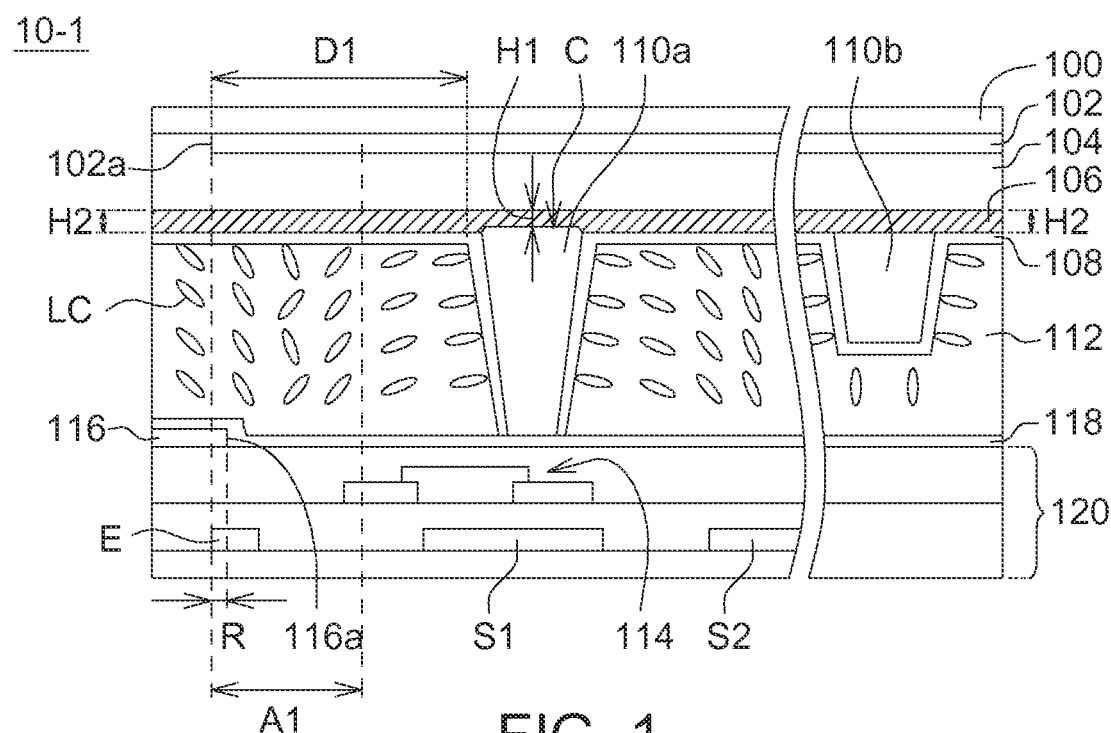
FIG. 1 shows a cross-sectional view of an LCD device according to an embodiment of the invention.

FIG. 1 shows a cross-sectional view of an LCD device 10-1 according to an embodiment of the invention. Referring to FIG. 1, the LCD device 10-1 comprises a first substrate 100, a light shielding layer 102, a color filtering layer 104, a first electrode 106, a first alignment layer 108, a main spacer 110a, an auxiliary spacer 110b, a liquid crystal layer 112, a transistor 114, a second electrode 116, a second alignment layer 118 and a second substrate 120.

As indicated in FIG. 1, the light shielding layer 102 may be disposed on the first substrate 100. The light shielding layer 102 can be a black matrix (BM) layer, a metal or non-metal opaque layer, and the light shielding layer 102 has an edge 102a. The color filtering layer 104 may be disposed on the light shielding layer 102 for selecting the range of wavelength of the light which could pass through. The color filtering layer 104 is a color filter (CF). In an embodiment, the color filtering layer 104 may selectively comprise a protection layer formed by a polymer such as epoxy resin and acrylic resin for protecting the color filtering layer 104 and enhancing surface smoothness.

The first electrode 106 may be disposed on the color filtering layer 104. The first electrode 106 may be formed by a conductive material. Preferably, the first electrode 106 is a transparent conductive layer formed by such as indium tin oxide (ITO). The first electrode 106 has a recess C. The shape of the recess C may be semi-circular, step-shaped or any other shapes, and a step-shaped recess C is illustrated for exemplification purpose. The recess C has a first thickness H1, the surrounding area of the recess C has a second thickness H2, and the first thickness H1 is smaller than the second thickness H2. The main spacer 110a is disposed in the recess C of the first electrode 106 and corresponding to a part of the first electrode 106 having the first thickness H1. The auxiliary spacer 110b is disposed on the surrounding area of the recess C of the first electrode 106 and corresponding to a part of the first electrode 106 having the second thickness H2. The alignment layer 108 is disposed on a part of the first electrode 106 having the second thickness H2, and is surrounding the sidewall of the main spacer 110a.

The second substrate 120 has a common electrode E, a main scan line S1, an auxiliary scan line S2 and a transistor 114. The transistor 114 is a thin film transistor (TFT). The second electrode 116 is disposed on the second substrate 120. The second electrode 116 and the first electrode 106 can be formed by the same material. The second alignment layer 118 is disposed on the second electrode 116 and the second substrate 120.

In the present embodiment, the height of the main spacer 110a is larger than that of the auxiliary spacer 110b. The main spacer 110a is mainly used for supporting the stress received between the first substrate 100 and the second substrate 120. The disposition of the auxiliary spacer 110b may reduce the space of the liquid crystal layer 112 that needs to be filled with liquid crystal molecules LC, hence reducing the usage amount of liquid crystal molecules LC and avoiding the bubble problem occurring to the liquid crystal layer 112. In an embodiment, the LCD device 10-1 may be a touch LCD device. The auxiliary spacer 110b may prevent the panel of the touch LCD device from being short-circuited when the panel is pressed.

As indicated in FIG. 1, the main spacer 110a is disposed between the first substrate 100 and the second substrate 120, and the height of the main spacer 110a is exactly equal to the distance from the surface of the recess C of the first electrode 106 to the second alignment layer 118. The height of the auxiliary spacer 110b is smaller than the distance from the surface of the first electrode 106 having the second thickness H2 (the peripheral part except the recess C) to the second alignment layer 118. The main spacer 110a is disposed in the recess C and is tightly embedded into the recess C. The recess C provides the main spacer 110a with a supporting force perpendicular to the first electrode 106 and parallel to the first electrode 106, such that the main spacer 110a can be more firmly fixed on the first electrode 106 and will not be shifted or deformed even when the first substrate 100 and the second substrate 120 respectively receive a stress.

Figure 2:
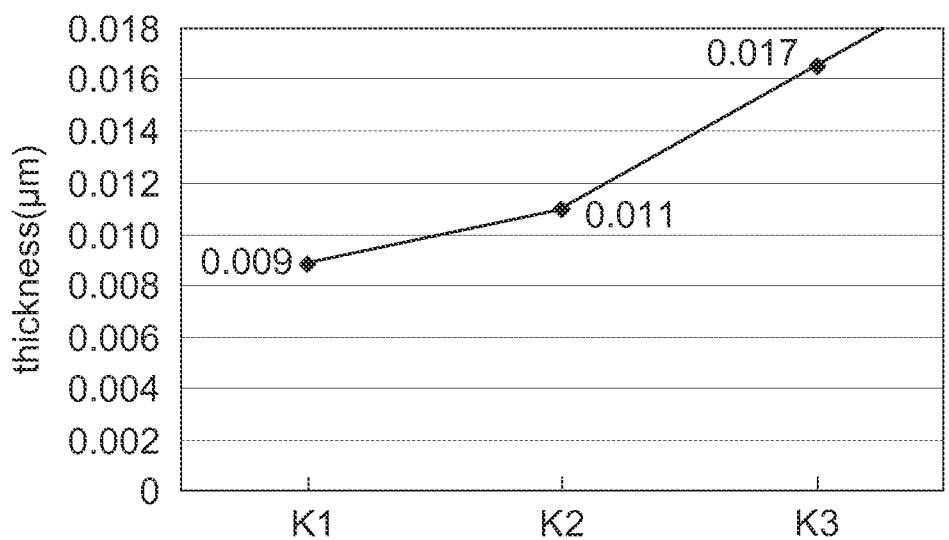
FIGS. 2-4 show broken line charts illustrating the correlation between the disposition position of a spacer and thickness of the corresponding first electrode according to an embodiment of the invention
Figure 3:
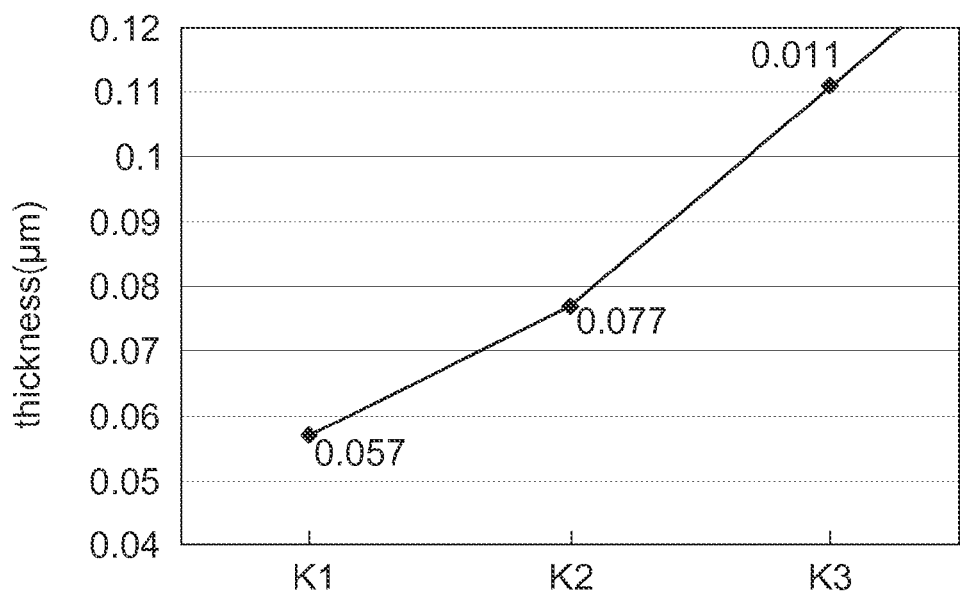
Figure 4:
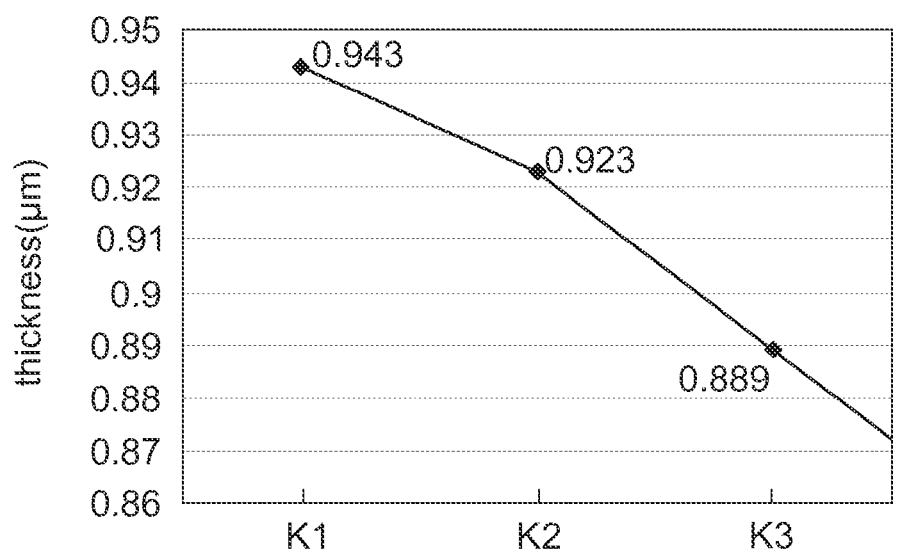

FIGS. 2-4 show broken line charts illustrating the correlation between the disposition position of a spacer and thickness of the corresponding first electrode according to an embodiment of the invention. Referring to FIG. 2, the vertical axis of the broken line chart, which adopts micrometer (μm) as unit of measurement, represents the difference between the second thickness H2 and the first thickness H1 of the first electrode 106. The horizontal axis of the broken line chart represents the measuring results of the samples K1, K2, and K3. As indicated in FIG. 2, the difference between the second thickness H2 and the first thickness H1 of the first electrode 106 must at least be larger than 8 nm such that the main spacer 110a (illustrated in FIG. 1) can be firmly fixed in the recess C.

Referring to FIG. 3, the vertical axis of the broken line chart, which adopts micrometer (μm) as unit of measurement, represents a ratio of the difference between the second thickness H2 and the first thickness H1 to the second thickness H2. The horizontal axis of the broken line chart represents the measuring results of the samples K1, K2, and K3. As indicated in FIG. 3, the ratio of the difference between the second thickness H2 and the first thickness H1 to the second thickness H2 must at least be larger than 0.05, such that the main spacer 110a (illustrated in FIG. 1) can be firmly fixed in the recess C.

Referring to FIG. 4. The vertical axis of the broken line chart, which adopts μm as unit of measurement, represents the ratio of the first thickness H1 to the second thickness H2 of the first electrode 106. The horizontal axis of the broken line chart represents the measuring results of the samples K1, K2, and K3. As indicated in FIG. 4, the ratio of the first thickness H1 to the second thickness H2 of the first electrode 106 must at least be smaller than 0.95 such that the main spacer 110a (illustrated in FIG. 1) can be firmly fixed in the recess C. (illustrated in FIG. 1).

Figure 5:
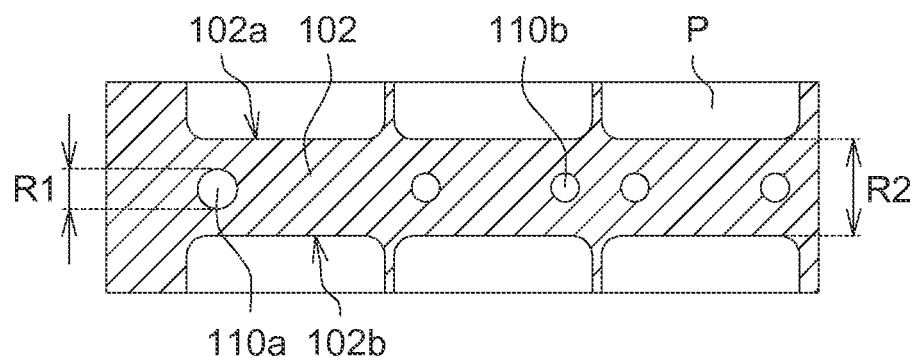
FIG. 5 shows a relative position between a spacer and a light shielding layer of an LCD device according to an embodiment of the invention.

FIG. 5 shows a top view of a spacer and a light shielding layer of an LCD device 10-1 according to an embodiment of the invention. In FIG. 5, only the main spacer 110a, the auxiliary spacer 110b and the light shielding layer 102 are illustrated for description purpose. The main spacer 110a may be a tapered cylinder, wherein the top surface and the bottom surface may have different diameters. For example, the diameter of the top surface may be larger than that of the bottom surface, and the invention is not limited thereto. As indicated in FIG. 5, the light shielding layer 102 (slashed area) covers the main spacer 110a and the auxiliary spacer 110b, but the light shielding layer 102 does not cover the pixel unit P. The distance R1 is equal to the diameter of the top surface of the main spacer 110a. The distance R2 is the width of the light shielding layer 102, such as the distance from the edge 102a to the edge 102b of the light shielding layer 102.

Referring to FIG. 1 and FIG. 5. The LCD device 10-1 of FIG. 1 could be a vertical alignment (VA) LCD device, and the long axis of the liquid crystal molecules LC is perpendicular to the alignment layer 108 and the alignment layer 118. However, the liquid crystal molecules LC are affected by the electrical field between the first electrode 106 and the second electrode 116 and rotate accordingly. The stronger the electrical field received by the liquid crystal molecules LC, the larger the influence generated on the liquid crystal molecules LC by the electrical field. In other words, the liquid crystal molecules LC are actuated by the alignment layer 108, the alignment layer 118, and the electrical field between the first electrode 106 and the second electrode 116. In an area with a weaker electrical field, the liquid crystal molecules LC are arranged according to the alignment layer 108 and the alignment layer 118. In an area with stronger electrical field, the liquid crystal molecules LC are mainly affected by the electrical field between the first electrode 106 and the second electrode 116 and are twisted according to the electrical field.

In the unstable area A1 between the alignment layer 108, the alignment layer 118, the first electrode 106 and the second electrode 116, the liquid crystal molecules LC are affected by the alignment layer 108,118 and the electrical field between the first electrode 106 and the second electrode 116 to move in an irregular manner. An unexpected display effect such as wave pattern may easily occur in the unstable area A1. Therefore, the edge 102a of the light shielding layer 102 must be designed to at least cover the unstable area A1. Besides, the edge 116a of the second electrode 116 is protruded from the edge 102a of the light shielding layer 102 by a protrusion distance R being 1.5 μm to 10 μm.

Referring to FIG. 1 and FIG. 5. The size of the light shielding layer 102 determines the aperture ratio of the LCD device 10-1. In an embodiment, the width of the light shielding layer 102, such as the distance R2 can be reduced to increase the aperture ratio of the LCD device 10-1. As the distance R2 is reduced, the distance D1 between the edge 102a or edge 102b 102 and the main spacer 110a is reduced accordingly. Therefore, the distance D1 between the edge 102a and the main spacer 110a is an important parameter in the design of increasing the aperture ratio of the LCD device 10-1 and shielding the unstable area A1 with the light shielding layer 102.

In an embodiment of the LCD device 10-1, the distance D1 between the edge 102a of the light shielding layer 102 and the main spacer 110a is at least larger than 5 micrometers (μm) and smaller than 26 μm. When the distance D1 between the edge 102a and the main spacer 110a is larger than 10 μm, the light shielding layer 102 is large enough to shield the unstable area A1.

Figure 6:
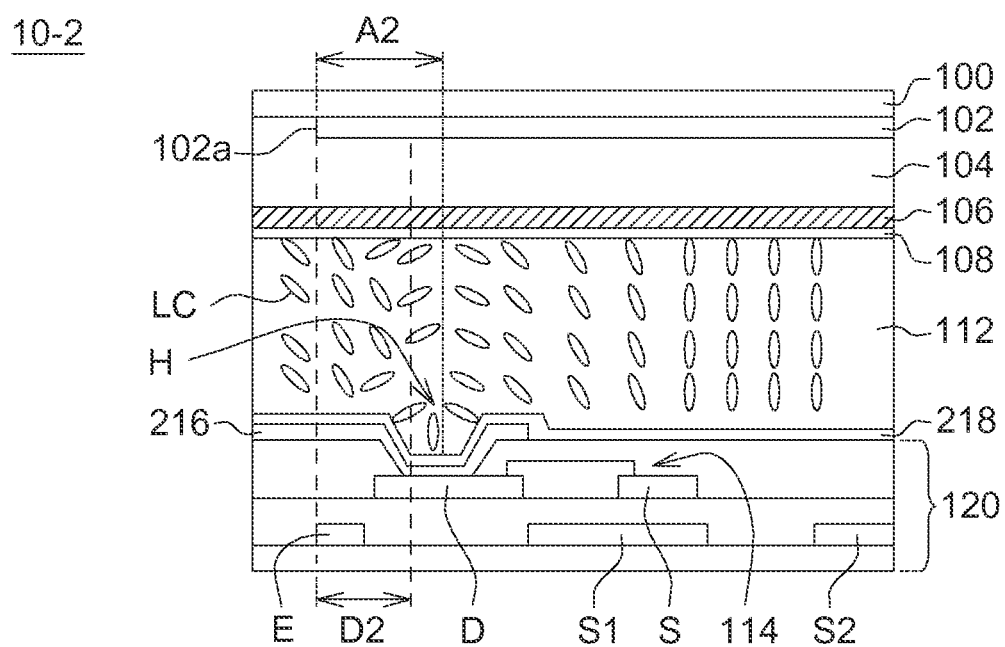
FIG. 6 shows a cross-sectional view of an LCD device according to an embodiment of the invention.
Figure 7:
FIGS. 7-11 show a process flow for manufacturing an LCD device of FIG. 1.

FIG. 6 a cross-sectional view of an LCD device 10-2 according to an embodiment of the invention. As indicated in FIG. 6, the LCD device 10-2 comprises a first substrate 100, a light shielding layer 102, a color filtering layer 104, a first electrode 106, a first alignment layer 108, a liquid crystal layer 112, a transistor 114, a second electrode 216, a second alignment layer 218 and a second substrate 120. The LCD device 10-2 is similar to the LCD device 10-1 of FIG. 1. Common reference numerals are used throughout the drawings and the detailed description to indicate the same elements, and the similarities are not repeated here. The schematic diagrams of the LCD devices 10-1 and 10-2 can be different areas of the same LCD device.

The LCD device 10-2 has a contact hole H. The transistor 114 has a drain electrode D and a source electrode S. The second electrode 216 can be electrically connected to the drain electrode D of the transistor 114 through the contact hole H. The second alignment layer 218 covers the second electrode 216 and the second substrate 120. Similarly, the arrangement of the liquid crystal molecules LC is affected by the alignment layer 108 and the alignment layer 218, and the liquid crystal molecules LC are affected by the electrical field between the first electrode 106 and the second electrode 216 and rotate accordingly. The LCD device 10-2 has a contact hole H, and the second electrode 216 and the alignment layer 218 are disposed above the contact hole H in a manner different from that disposed surrounding the contact hole H. An unstable area A2 is formed around the contact hole H and the second electrode 216. Since the liquid crystal molecules LC in the unstable area A2 move in an irregular manner, a non-expected display effect such as wave pattern may easily occur in the unstable area A2. Therefore, the edge 102a of the light shielding layer 102 must at least cover the unstable area A2.

In an embodiment, the distance D2 between an edge 102a of the light shielding layer 102 of the LCD device 10-2 and an edge of the contact hole H at least is larger than 5 μm and smaller than 26 μm. When the distance D2 between the edge 102a and the contact hole H is larger than 10 μm, the light shielding layer 102 is large enough to shield the unstable area A2. Therefore, the distance D2 between the edge 102a of the light shielding layer 102 and the contact hole H is an important parameter in the design of increasing the aperture ratio of the LCD device 10-2 and shielding the unstable area A2 with the light shielding layer 102.

FIGS. 7-11 are processes of manufacturing an LCD device 10-1 of FIG. 1. Referring to FIG. 1. Firstly, a first substrate 100 is provided, and a light shielding layer 102, a color filtering layer 104 and a conductive material 106' are accordingly formed on the first substrate 100. The conductive material 106' can be a transparent conductive material such as indium tin oxide (ITO).

Figure 8:
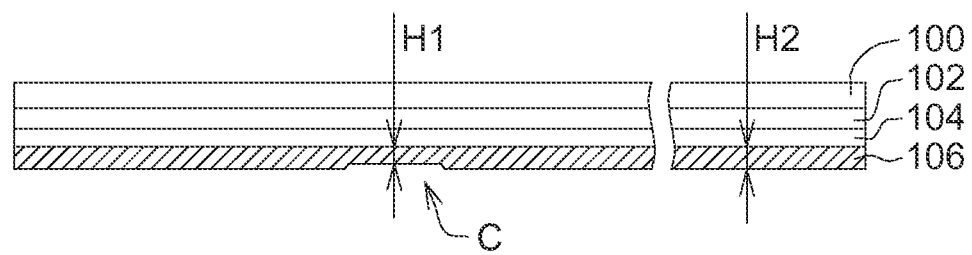

Referring to FIG. 8. A photo process is performed for exposure and development processing, and a recess C is formed by an etching process. Then, a first electrode 106 is formed, wherein the first electrode 106 has a first thickness H1 and a second thickness H2, and the second thickness H2 is larger than the first thickness H1. In the present embodiment, the recess C can be circular, rectangular or elliptical, and any shapes would do as long as the recess C can be tightly engaged in conjunction with the top surface of the main spacer 110a (illustrated in FIG. 1).

Figure 9:
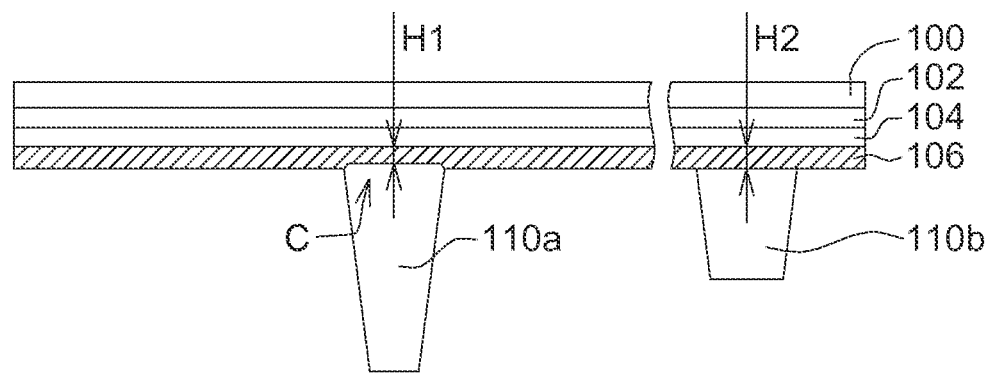

Referring to FIG. 9. A main spacer 110a and an auxiliary spacer 110b are formed at the same time by using a mask or a half-tone mask. The main spacer 110a is formed in the recess C of the first electrode 106 and corresponding to the first thickness H1. The auxiliary spacer 110b is formed in the surrounding area of the recess C of the first electrode 106 and corresponding to the second thickness H2.

Figure 10:
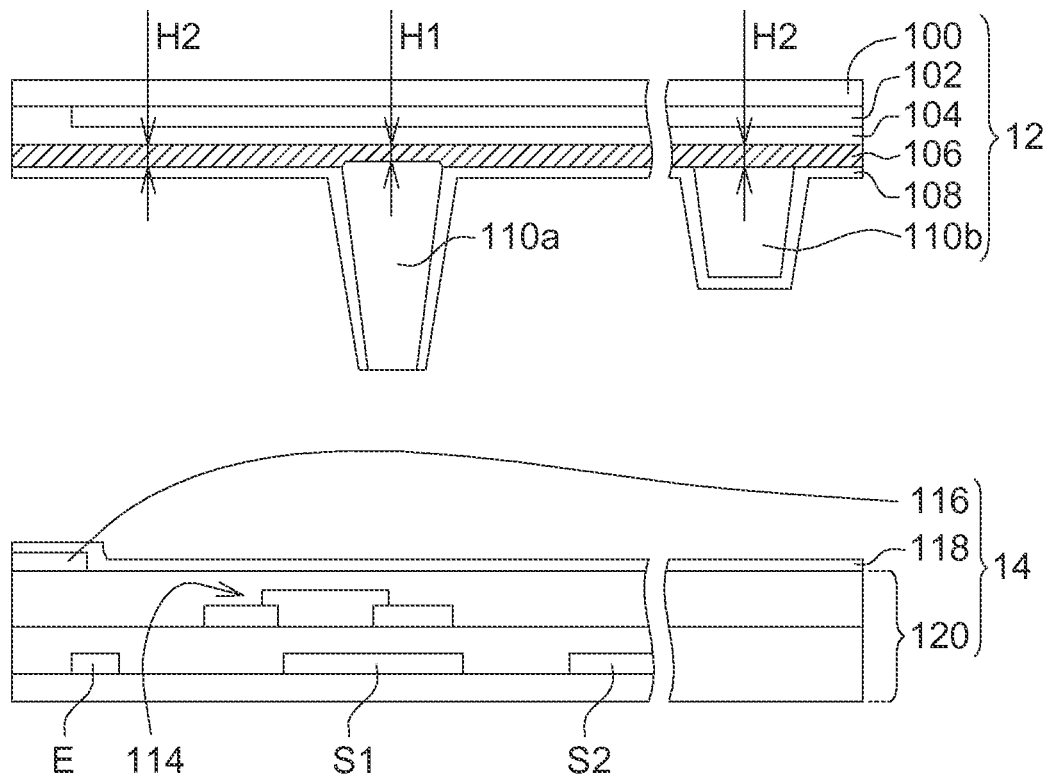
Figure 11:
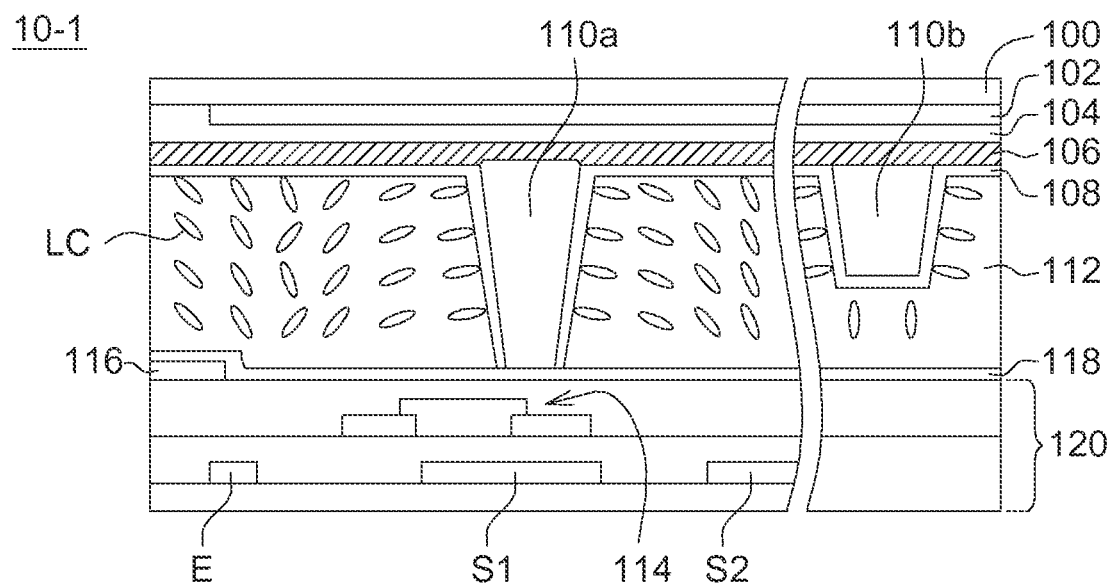

Referring to FIG. 10. A first alignment layer 108 is formed, wherein the first alignment layer 108 covers the exposed first electrode 106 (the part of the first electrode 106 having the thickness H2), a sidewall of the main spacer 110a, and a sidewall of the auxiliary spacer 110b to form a first plate 12. Then, a second plate 14 is provided, wherein the second plate 14 comprises a second electrode 116, a second alignment layer 118 and a second substrate 120. The second substrate 120 has a transistor 114, a main scan line S1, an auxiliary scan line S2 and a common electrode E. Then, the first plate 12 and the second plate are assembled together. Referring to FIG. 11. Liquid crystal molecules LC are injected between the first substrate 100 and the second substrate 120 to form a liquid crystal layer 112. Then, the manufacturing process of the LCD device 10-1 is completed.

In the manufacturing method of the LCD device 10-1 as indicated in FIGS. 7-11, the main spacer 110a is formed in the recess C after the recess C is formed on the first electrode 106. In another embodiment, another recess (not illustrated) can be formed on the second electrode 116 for receiving a corresponding main spacer. That is, the main spacer 110a does not have to be embedded in the recess C of the first electrode 106, and any design would do as long as one of the first substrate 100 and the second substrate 120 has a recess for receiving and fixing the main spacer 110a.

The LCD device 10-1 of FIG. 11 is exemplified by a vertical alignment (VA) LCD device. The design of embedding the main spacer 110a in the recess C according to an embodiment of the invention can also be used in any LCD devices requiring aligning and sealing upper and lower substrates, such as an in-plane switching (IPS) display.

An LCD device and a manufacturing method thereof are disclosed in above embodiments of the invention. The first electrode has a first thickness and a second thickness, and the second thickness is larger than the first thickness. The main spacer is disposed on the part of the first substrate corresponding to the first thickness of the first electrode, such that the main spacer can be tightly engaged through the thickness difference between the first thickness and the second thickness. Therefore, the problem that the first substrate and the second substrate may compress the main spacer after receiving a stress so that the main spacer become shifted and deformed can thus be avoided. In some embodiments, the range of distance between an edge of the light shielding layer and the main spacer and/or the range of distance between an edge of the light shielding layer and the contact hole can be designed in a manner that the unstable area in which the liquid crystal molecules move irregularly can be shielded even after the width of the light shielding layer is reduced. Therefore, not only increasing the aperture ratio of LCD device but also maintaining the display quality can be achieved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) device, comprising:
   a first substrate;
   a first electrode disposed on the first substrate, wherein the first electrode comprises a first part and a surrounding area around the first part, the first part has a first thickness and the surrounding area has a second thickness;
   a second substrate disposed opposite to the first substrate;
   a liquid crystal layer disposed between the first substrate and the second substrate; and
   a spacer disposed between the first substrate and the second substrate, and the spacer disposed corresponding to the first part of the first electrode;
   wherein the first thickness is smaller than the second thickness.

2. The LCD device according to claim 1, wherein a difference between the second thickness and the first thickness is larger than 8 nm and smaller than 4 µm.

3. The LCD device according to claim 1, wherein the ratio of the first thickness to the second thickness is larger than 0.1 and smaller than 0.95.

4. The LCD device according to claim 1, wherein the second thickness and the first thickness has a difference, and the ratio of the difference to the second thickness is larger than 0.05 and smaller than 0.2.

5. The LCD device according to claim 1, further comprising:
   a light shielding layer disposed between the first substrate and the first electrode, wherein a smallest distance between an edge of the light shielding layer and a sidewall of the spacer is between 5 µm to 26 µm.

6. The LCD device according to claim 1, further comprising:
   a transistor disposed on the second substrate;
   a second electrode electrically connected to the transistor through a contact hole; and
   a light shielding layer disposed between the first substrate and the first electrode, wherein the distance between an edge of the light shielding layer and the contact hole is between 5 to 26 µm.

7. The LCD device according to claim 6, wherein the edge of the second electrode is protruded from the light shielding layer by a protrusion distance being 1.5 µm to 10 µm.

8. The LCD device according to claim 1, further comprising:
   a second electrode disposed on the second substrate; and
   an alignment layer disposed on the surrounding area of the first part of the first electrode having the second thickness, the second electrode and the second substrate and further encapsulating a sidewall of the spacer.

9. The LCD device according to claim 8, wherein the LCD device is a vertical alignment LCD device.

10. The LCD device according to claim 1, further comprising:
    a light shielding layer disposed on the first substrate; and
    a color filtering layer disposed between the light shielding layer and the first electrode.

11. The LCD device according to claim 1, wherein the first part of the first electrode is a recess having the first thickness.

12. The LCD device according to claim 1, wherein a height of the spacer is larger than a height of an auxiliary spacer disposed on the surrounding area of the first part.

13. A manufacturing method of LCD device, comprising:
    providing a first substrate, wherein a first electrode is disposed on the first substrate and has a first thickness and a second thickness, and the first thickness is smaller than the second thickness;
    forming a main spacer on the first substrate corresponding to a first part of the first electrode having the first thickness;
    forming an auxiliary spacer on the first substrate corresponding to a second part of the first electrode having the second thickness, wherein a surrounding area of the first part of the first electrode has the second thickness, and the main spacer is disposed on the first part of the first electrode;
    aligning and sealing the first substrate with a second substrate; and
    injecting a liquid crystal layer between the first substrate and the second substrate.

14. The manufacturing method of LCD device according to claim 13, wherein the step of providing the first substrate having the first electrode comprises:
    providing the first substrate;
    forming a conductive material on the first substrate; and
    etching the conductive material to form a recess, wherein the recess is the first part having the first thickness.

15. The manufacturing method of LCD device according to claim 14, wherein the conductive material is etched to form the recess, such that a difference between the second thickness and the thickness of the recess is larger than 8 nm and smaller than 4 µm.

16. The manufacturing method of LCD device according to claim 14, wherein the conductive material is etched to form the recess, such that the ratio of the thickness of the recess to the second thickness is larger than 0.1 and smaller than 0.95.

17. The manufacturing method of LCD device according to claim 14, wherein the conductive material is etched to form the recess, such that there is a difference between the second thickness and the thickness of the recess, and the ratio of the difference to the second thickness is larger than 0.05 and smaller than 0.2.

18. The manufacturing method of LCD device according to claim 14, wherein the LCD device further comprises a light shielding layer formed between the first substrate and the first electrode, the recess is formed at a position 5 µm to 26 µm away from an edge of the light shielding layer, and the main spacer is formed in the recess and fixed on a surface of the recess.

19. The manufacturing method of LCD device according to claim 14, wherein the main spacer and the auxiliary spacer are formed by a half-tone mask at the same time.

20. The manufacturing method of LCD device according to claim 13, wherein the second substrate has a second electrode and a transistor, the second electrode is electrically connected to the transistor through a contact hole, and before sealing the first substrate with the second substrate, the manufacturing method of LCD device further comprises:
    forming an alignment layer on the second part of the first electrode having the second thickness, the second electrode and the second substrate, and the alignment layer further encapsulating a sidewall of the main spacer.

* * * * *